United States Patent
Kato et al.

[11] Patent Number: 5,198,175
[45] Date of Patent: Mar. 30, 1993

[54] PROCESS FOR PRODUCING DEEP-DRAWN PLASTIC CONTAINER

[75] Inventors: Nobuyuki Kato; Hisakazu Yasumuro; Ken Takenouchi, all of Yokohama, Japan

[73] Assignee: Toyo Seikan Kaisha Ltd., Tokyo, Japan

[21] Appl. No.: 734,087

[22] Filed: Jul. 22, 1991

Related U.S. Application Data

[63] Continuation of Ser. No. 415,221, filed as PCT/JP88/01269 on Dec. 14, 1988, abandoned.

[30] Foreign Application Priority Data

Dec. 15, 1987 [JP] Japan ................. 62-315377

[51] Int. Cl.$^5$ ............... B29C 51/10; B29C 51/38
[52] U.S. Cl. .................... 264/512; 264/549; 264/550; 425/387.1; 425/388
[58] Field of Search ............. 264/550, 512, 553, 513, 264/515, 549, 554; 425/388, 387.1, 384

[56] References Cited

U.S. PATENT DOCUMENTS

| | | | |
|---|---|---|---|
| 2,973,558 | 3/1961 | Stratton, Jr. | 264/550 |
| 2,990,581 | 7/1961 | Rowe, Jr. | 264/549 |
| 3,315,313 | 4/1967 | Steigman | 425/388 |
| 3,349,153 | 10/1967 | Beck | 264/550 |
| 3,357,053 | 12/1967 | Lyon et al. | 264/553 |
| 3,465,071 | 9/1969 | Edwards | 264/550 |
| 3,488,413 | 1/1970 | Watts, Jr. | 264/550 |
| 3,586,748 | 6/1971 | Ayres | 264/550 |
| 3,943,215 | 3/1976 | Grüne et al. | 264/512 |
| 4,025,275 | 5/1977 | Gournelle | 425/387.1 |
| 4,092,390 | 5/1978 | Mulvany, Jr. | 264/550 |
| 4,239,727 | 12/1980 | Myers et al. | 425/388 |

FOREIGN PATENT DOCUMENTS

| | | | |
|---|---|---|---|
| 55-103918 | 8/1980 | Japan | 264/549 |
| 59-1211 | 1/1984 | Japan . | |

*Primary Examiner*—Jan H. Silbaugh
*Assistant Examiner*—Catherine Timm
*Attorney, Agent, or Firm*—Sughrue, Mion, Zinn, Macpeak & Seas

[57] ABSTRACT

In the deep-drawn molding of a plastic container, a molten plastic sheet is positioned between a plug and a mold. The molten sheet is supported on an upper mold surface portion having heat insulating property and slipperiness, and while a positive pressure is created between the mold and the molten sheet, the molten sheet is molded by moving the plug and the mold relative to each other in a closing direction. By drawing the molten sheet into the mold while allowing it to slide over the above upper mold surface portion, the amount of the molten plastic sheet drawn into the mold is increased, and a container can be produced which has a uniform height direction and a uniform thickness distribution in the container height direction and possesses good appearance characteristics without the occurrence of a drag line in its side wall.

13 Claims, 3 Drawing Sheets

FIG.4

PROCESS FOR PRODUCING DEEP-DRAWN PLASTIC CONTAINER

This is a continuation of application Ser. No. 07/415,221 filed as PCT/JP88/01269 on Dec. 14, 1988, now abandoned.

TECHNICAL BACKGROUND

This invention relates to a process for producing a deep-drawn plastic container. More specifically, it relates to a process for producing a deep-drawn container having uniformity in thickness in the height direction and excellent appearance characteristics from a plastic sheet in the molten state.

PRIOR ART

As a method of producing a deep-drawn plastic container from a plastic sheet, a plug assist pressure or vacuum forming method using a plug as an assist has previously been known.

The plug assist molding technique is divided into a solid phase sheet molding method which comprises preliminarily heating a plastic sheet to a temperature which is below its melting point but at which it can be stretch-molded, introducing the heated plastic sheet between a molding plug and an open mold, raising the sheet with the molding plug and moving it within the mold, and introducing a pressure fluid between the plug and the sheet, or creating a vacuum between the sheet and the mold, to perform molding on the mold surface; and a molten sheet molding method by which the same molding as above is carried out except that the plastic sheet is heated to a temperature above the melting point of the plastic sheet.

As an example of the former molding method, Japanese Patent Publication No. 23536/1984 describes a method of producing a plastic container which comprises heating a plastic sheet with its end portions fixed by a fixing device such as a chuck to the molding temperature, introducing the sheet between a heated assisting plug disposed within a molding box and a sheet holding plate having a larger opening portion than the opening portion of a female mold and being provided on the peripheral portion of the opening of the female mold, advancing the plug in the direction of the opening of the female mold to draw the sheet, then advancing the sheet holding plate in the direction of the molding box to a height equivalent to the clamped plane of the sheet, drawing the bottom portion of the sheet raised by the projection of the plug with the opening end portion of the holding plate, then advancing the cooled female mold in the direction of the molding box, putting the raised sheet portion thrusted out by the plug into the opening portion of the female mold, compressing the peripheral portion of the sheet with the molding box and the peripheral part of the female mold, immediately then introducing a pressure fluid into the molding box, and molding the sheet on the surface of the female mold and cooling it.

According to the solid phase molding method, molecular orientation is imparted to the side wall portion of the container, and an improvement in strength, transparency and gas-barrier property is expected. On the other hand, the reduction of heat resistance owing to the heat shrinkage of the container wall becomes a problem, and this method cannot at all be applied to the use of preservable containers which require hot filling or retorting.

The greatest problem with the production of a deep-drawn container by the molten sheet molding method is that unlike the case of the solid-phase molding, the molten resin mass has a considerably low tension. Accordingly, the molded container cannot have uniformity in thickness in the height direction, and particularly, of the container tends to become thick in the bottom corner portions and the upper portion in the height direction. Another problem is that when the molten sheet is drawn into the mold cavity, a drag line (a trace of contact) tends to occur in the upper portion of the container in its height direction as a result of contacting of the sheet material with the upper portion of the mold.

The most important point in solving the above problems which arise in the deep-draw molding of the molten sheet depends upon how much molten sheet can be drawn into the mold cavity while minimizing a temperature fall in the sheet. Even if the above-described deep-draw molding methods in the prior art are applied to a molten sheet, the sheet cannot be drawn in a sufficient amount into the mold, and the above problems still remain unsolved.

ESSENCE OF THE INVENTION

It is an object of this invention therefore to provide a process by which in the plug assist vacuum and/or pressure forming of a plastic sheet in the molten state, the molten sheet can be drawn in a large amount into the mold cavity while minimizing its temperature fall.

Another object of this invention is to provide a process capable of producing a deep-drawn plastic container which has a uniform thickness distribution in its height direction, excellent appearance characteristics without formation of a drag line in its side wall, and retorting resistance and heatability by an electronic oven.

According to this invention, there is provided a process for producing a deep-drawn plastic container by plug assist vacuum and/or pressure forming of a plastic sheet in the molten state, which comprises moving a plug and a mold relative to each other in a closing direction, creating a positive pressure between the mold and the molten sheet, drawing the molten sheet into the mold while allowing it to slide over the upper surface portion of the mold having heat insulating property and slipperiness, and then after mold clamping, contacting the molten sheet with the mold to cool it.

In the present invention, the upper surface portion of the mold is preferably composed of an annular member having heat insulating property and slipperiness and being positioned diametrically outwardly of, and above, the opening portion of the mold cavity. Furthermore, this annular member is desirably provided such that a tangent contacting the inner circumference of the annular member and the opening portion of the mold cavity is at 20 to 70 degrees to the upper surface of the annular member.

DESCRIPTION OF PREFERRED EMBODIMENTS

In the present invention, the molten plastic sheet is positioned between the plug and the mold, and molded by moving the plug and the mold relative to each another in a closing direction. The marked characteristic is that the relative movement is carried out while the molten sheet is supported on an upper mold surface portion which has heat insulating property and slipperiness, and a positive pressure is created between the mold and the molten sheet, and that the molten sheet is drawn into the mold while the sheet is allowed to slide over the above-mentioned upper mold surface portion.

Supporting of the molten sheet on the upper surface portion of the mold having heat insulating property and slipperiness has a dual function of enabling a positive pressure to be created between the mold and the molten sheet and of maximizing the amount of the molten sheet drawn without a substantial temperature fall.

Firstly, according to this invention, as a result of producing a positive pressure between the mold and the molten sheet, the molten sheet is pressurized toward the plug, and prevented from contacting the mold surface. In particular, when the state of the plug inserted into the mold is observed, it is found that in the molding process of this invention, the height of the molten sheet wrapped about the side wall of the plug is markedly increased. Accordingly, even when the plug is inserted deep into the mold cavity, the molten sheet is effectively prevented from contacting the opening end of the mold. Thus, according to this invention, the occurrence of a drag line in the upper portion of the side wall of the molten container and the deterioration of its appearance characteristics owing to the drag line are prevented. The increase of the wrapping height about the side wall of the plug contributes to an increase in the amount of the molten sheet drawn into the mold.

Secondly, the present invention offers the advantage that the amount of the molten sheet drawn can be maximized because the molten sheet is drawn while sliding over the above-described upper surface mold portion. If the molten sheet is drawn while supporting it by some device, only that part of the sheet which is inwardly of its position restrained by this device is elongated, and it is generally difficult to inwardly draw that part of the molten sheet which is outwardly of the restrained position. According to this invention, the supporting portion has heat insulating property and slipperiness, and by combining this feature with the aforesaid positive pressure creating operation, the molten sheet slides over this supporting portion and is stretched uniformly as a whole. Hence, the amount of the molten resin drawn into the mold can be maximized. Consequently, when a comparison is made between plastic sheets of the same thickness, the unit weight of the container produced in accordance with this invention increases, and the excessive thinning of the side wall portion of the container or the non-uniform distribution of thickness can be effectively prevented.

MOLDING PROCESS

Figure 1:
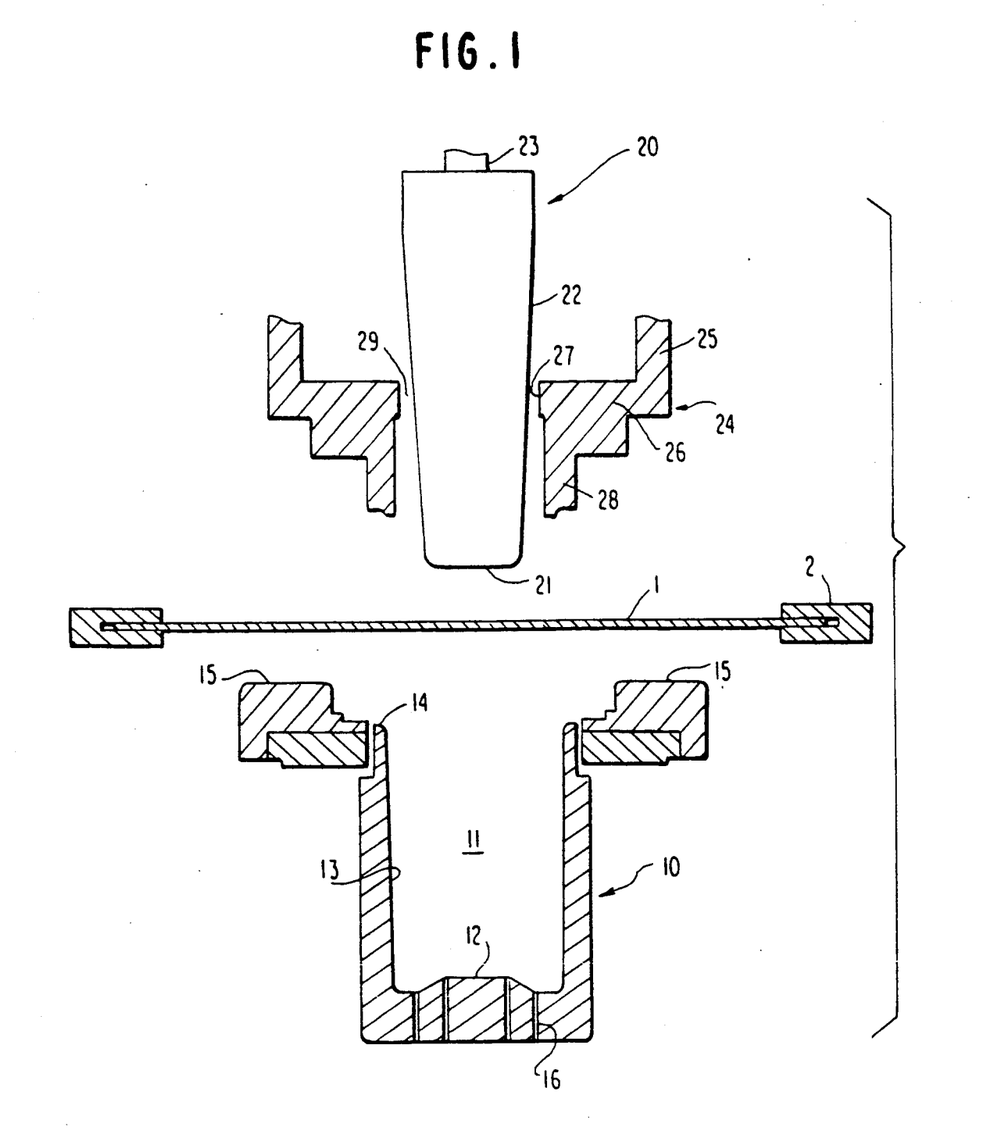
FIG. 1 is a view for illustrating the states of the mold, plug and molten sheet in a preparatory stage before molding.
Figure 2:
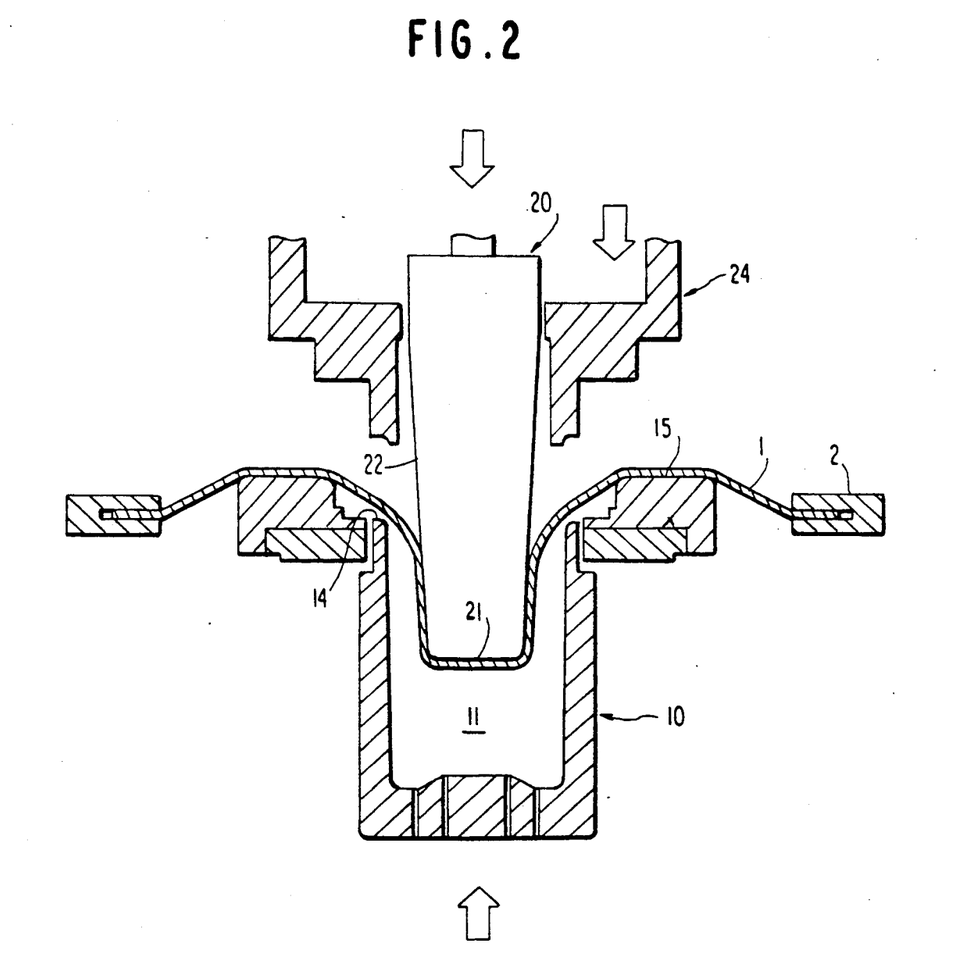
FIG. 2 is a view for illustrating the states of the mold, plug and molten sheet in a deep-draw molding state.
Figure 3:
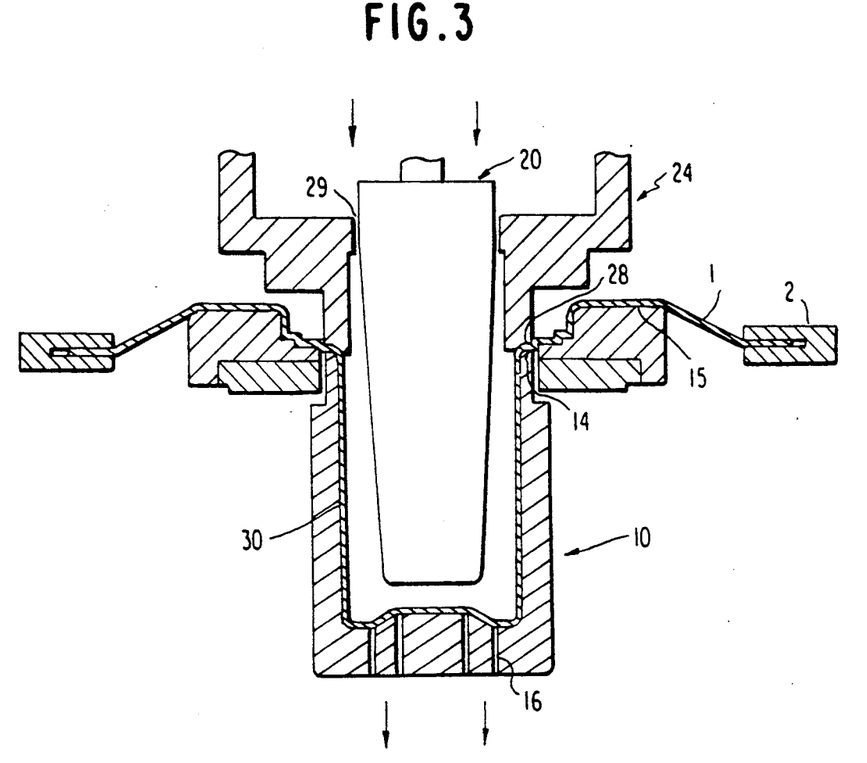
FIG. 3 is a view showing the states of the mold, plug and container in a vacuum and/or pressure forming stage.

In FIGS. 1 to 3 for illustrating the molding process of this invention, FIG. 1 shows a preparatory stage before molding. In this preparatory stage, a mold shown generally at 10 and a plug shown generally at 20 are in the most spaced-apart relationship. A plastic sheet 1 in the molten state supported by a fixing member 2 such as a chuck is fed between the mold 10 and the plug 20.

The mold 10 has a cavity 11 inside, a bottom wall surface 12 defining the bottom wall of a container to be formed, and a side wall surface 13 defining the side wall of the container. An opening 14 defining an open flange portion of the container is positioned at the upper end of the side wall surface 13. An annular portion 15 having heat insulating property and slipperiness is provided on the uppermost surface of the mold. The mold 10 is provided so that it is free to move in the direction of the height of the side wall portion 13, namely in the vertical direction in the drawing. It is at the lowermost position in FIG. 1. At the bottom wall portion of the mold is provided a gas hole 16 for discharging gas from between the wall of the container being molded and the inside surface of the mold, or for maintaining the space under reduced pressure.

The plug 20 has a tip portion 21 to be in engagement with the sheet and a tapered side wall portion 22 for drawing the sheet, and is connected to a driving shaft 23. The plug 20 is also provided movably in the direction of the height of the side wall portion 22, namely in the vertical direction in the drawing, but is at the most elevated position in FIG. 1. An upper mold 24 is provided coaxially with the plug 20. The upper mold 24 is comprised of a cylindrical side wall portion 25 and a bottom wall portion 26, and an opening portion 27 through which the plug 20 can pass is formed in the bottom wall portion 26. In the underside of the bottom portion 26 is provided an engaging projecting portion 28 which is adapted to engage the mold opening portion 14 via the plastic sheet and form a flange portion of the container by compression molding, and tightly seals the mold 10 and the upper mold 24. The upper mold 24 is also provided movable in a vertical manner, but its ascending and descending movements can be carried out independently from the plug 20. An annular space 29 is formed between the upper mold 24 and the plug when the plug 20 has moved downwardly to the lowest position with respect to the plug 20. The interior of the upper mold 24 is connected to a pressurized gas mechanism, and the pressurized gas can be supplied downwardly via the space 29.

FIG. 2 shows the molten plastic sheet being draw-molded. Specifically, from the preparatory stage shown in FIG. 1, the mold 10 rises and the plug 20 begins to descend. As a result, the annular portion 15 of the upper surface of the mold engages the undersurface of the molten plastic sheet 1. Since the annular portion 15 is heat-insulating, its engagement with the molten plastic sheet does not substantially cause a temperature fall in the molten plastic. The tip portion 21 of the plug 20 engages the upper surface of the molten plastic sheet 1 to draw the sheet 1 toward the cavity 11 of the mold. At the time of drawing, the upper surface of the mold is closed by the molten plastic sheet 1 and the sheet 1 is drawn into the cavity. Hence, a positive pressure is produced within the cavity 11. Owing to the descending movement of the plug 20 and the creation of a positive pressure within the mold cavity 11, the molten plastic sheet is wrapped along a large length about the side wall portion 22 of the plug. Owing to the increase of this wrapping length, the contacting of the molten plastic sheet 1 with the mold opening portion 14 is prevented. As the plug 20 and the mold 10 move relative to each other in the closing direction, the molten plastic sheet 1 is drawn effectively into the mold cavity 11. Since the annular member 15 has slipperiness, the molten plastic sheet slides over the annular member 15 of the upper surface of the mold and is at the same time effectively drawn into the cavity 11, as already stated hereinabove.

At the time of drawing the molten sheet, it is also effective to introduce a pressurized gas into the mold from the gas hole 16 and to control the pressure of the mold cavity.

In FIG. 3 showing the vacuum and/or pressure forming stage, the plug 20 is inserted deepest in the mold. The upper mold 24 is lowered, and sealing is effected between the sealing engaging portion 28 and the mold opening portion 14 via the plastic sheet. Simultaneously with this, a pressurized gas is blown between the drawn molten plastic sheet 1 and the plug 20 via the space 29 formed between the upper mold 24 and the plug 20, and the mold cavity 11 is maintained vacuum (under reduced pressure) via the gas hole 16. Consequently, the drawn molten plastic sheet is expanded, cooled by contact with the mold surface, and thus molded into a drawn container 30.

RESIN MATERIAL

In the present invention, the plastic sheet may be formed of any thermoplastic resin material which can be melt-molded. Examples include olefin resins, styrene resins, vinyl chloride resins, vinylidene chloride resins, polyester resins and polyamide resins. They may be used singly or in combination with each other. Of these, the olefin resins are advantageously used in the molding process of this invention. The olefin resins that can be used comprise olefins as a main structural monomer and are crystalline. Examples are low-, medium- and high-density polyethylene, isotactic polypropylene, crystalline propylene/ethylene copolymer, crystalline ethylene/butene copolymer, crystalline ethylene/propylene/butene copolymer, and blends of these. Ethylene/vinyl acetate copolymer, ethylene/acrylate copolymers and ionically crosslinked olefin copolymers (ionomers) may also be used alone or in combination with other olefin resins so long as they are crystalline. Polypropylene is especially suitable for production of containers which are to be retorted or re-heated.

The olefin resins may be used alone. But from the viewpoint of preservability of contents, it is preferred to use them in combination with oxygen-barrier resins. The oxygen-barrier resins are resins having an oxygen permeation coefficient of not more than $5.5 \times 10^{-12}$ cc. cm/cm$^2$.sec.cm Hg (37° C., 0% RH), for example ethylene/vinyl alcohol copolymer, polyamide resins, vinylidene chloride resins and high nitrile resins.

Figure 4:
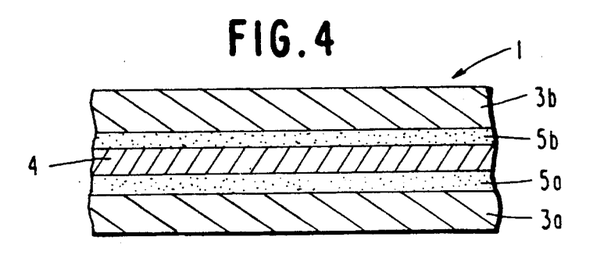
FIG. 4 is an enlarged sectional view showing one example of the sectional structure of the plastic sheet.

In FIG. 4 showing the sectional structure of the plastic sheet suitably used for the purpose of this invention, the sheet 1 has a laminated structure composed of an inside layer 3a and an outside layer 3b of a moisture-resistant thermoplastic resin such as an olefin resin or a styrene resin, an interlayer 4 of the gas-barrier resin, and as required, adhesive layers 5a and 5b provided for firm adhesion between the inside and outside layers and the interlayer. The laminated structure is preferably produced by co-extruding the moisture-resistant thermoplastic resin, the gas-barrier resin and if required, the adhesive resin through a multilayer multiple die into the above multilayer structure. It may of course be produced by other laminating techniques such as sandwich lamination and extrusion coating.

Examples of the adhesive resins that can be used are resins which show adhesion both to the moisture-resistant thermoplastic resin and to the oxygen-barrier resin, such as acid-modified olefin resins (e.g., maleic anhydride graft modified polyethylene and maleic anhydride graft modified polypropylene), ethylene/vinyl acetated copolymer, ethylene/acrylate copolymers, and ionomers. A layer of a scrap resin composition from the sheet (i.e., a composition of the moisture-resistant resin, the oxygen barrier resin and the adhesive resin) may be interposed between the adhesive resin layer and the moisture-resistant thermoplastic resins.

The plastic sheet used in this invention may contain known additives to plastics, for example an antioxidant, a heat stabilizer, an ultraviolet absorber, an antistatic agent, a filler and a coloring agent. For the purpose of opacifying the resulting molded containers, it is possible to incorporate a filler such as calcium carbonate, calcium silicate, alumina, silica, various grades of clay, calcined gypsum, talc and magnesia, or an inorganic or organic pigment such as titanium white, yellow iron oxide, red iron oxide, ultramarine and chromium oxide.

Preferably, the plastic sheet used in this invention has a thickness of generally 0.5 to 5 mm, especially 1 to 3 mm although it may vary depending upon the size of the container, etc. In the above plastic sheet of the laminated structure, the ratio of the thickness ($t_A$) of the inside or outside layer of the moisture-resistant resin to the thickness ($t_B$) of the interlayer of the oxygen-barrier resin is preferably within the following range.

$t_A:t_B = 100:1$ to $4:1$, especially $25:1$ to $5:1$.

MOLDING CONDITIONS

According to this invention, the plastic sheet is first heated to a temperature above its melting or softening point. The heating of the plastic sheet may be effected, for example, by infrared or far infrared ray heating, heating in a hot air oven, or conduction.

That portion of the upper surface of the mold which has heat insulating property and slipperiness is preferably formed from a heat-resistant plastic material having a low coefficient of friction, such as bakelite (novolak phenol resin), polycarbonate and Teflon (polytetrafluoroethylene). On the other hand, the mold is desirably formed from a metallic material having excellent heat conductivity, especially aluminum or an aluminum alloy, so that the wall of the plastic container being molded may be rapidly cooled. The above upper mold surface portion and main body of the mold should be provided integrally in such a relation that the space between them is sealed up. The upper mold surface portion having heat insulating property and slipperiness should be provided above, and diametrically outwardly of, the opening portion of the mold cavity. The angle ($\theta$) of a tangent contacting the inner circumference of this annular portion and the opening portion of the mold with respect to a plane containing this annular portion is desirably 20 to 70 degrees in general, and especially 35 to 45 degrees, from the standpoint of increasing the ratio of the plastic sheet utilized to make the container. If this angel ($\theta$) is less than the above range, a drag line is liable to occur. On the other hand, if it is larger than the above range, the amount of the plastic sheet drawn decreases, and the upper portion of the container is liable to become thin.

The plug may be formed of a material having high heat insulating property, for example, a heat-resistant plastic such as polyoxymethylene resin or polytetrafluoroethylene when no particular heating means is provided. When a heating means is to be built in the plug, the plug may be made of aluminum. Preferably, from the standpoint of molding operability, the outside diameter ($D_P$) of the plug tip is in the range of 35 to 80%, especially 60 to 70%, of the inside diameter ($D_M$) of the opening portion of the mold. Desirably, the tapering angle ($\alpha$) of the tapered side surface of the plug is in the range of 0.5 to 10 degrees, especially 2 to 6 degrees, in order to increase the wrapping height of the plastic sheet about the side surface. A curvature portion provided between the tip of the plug and the tapered side surface preferably has a radius (R) of generally 1 to 25 mm, especially 3 to 10 mm. If R is larger than the above range, the bottom and corners of the container tend to become thin. If it is smaller than the above range, the bottom of the container tends to become thick. Desirably, the positive pressure (P) to be created in the space between the mold and the molten sheet is generally 0.02 to 0.05 kg/cm$^2$-G, especially 0.06 to 0.2 kg/cm$^2$-G. If this pressure (P) is lower than the above range, a drag line is liable to form. If it is higher than the above range, the resulting container wall tends to become thin. This pressure may be adjusted by controlling escape of air from the bottom of the mold at the time of drawing, or by adjusting the speed of relative molding of the plug to the mold cavity, or by introducing a pressurized gas into the mold cavity from the gas hole at the bottom.

In the present invention, the plug pushing rate defined by the equation to be given below is desirably 70 to 98% in general, and especially 90 to 98%. Preferably, the plug volume ratio is 25 to 80%, especially 40 to 60%. According to this invention, it is noteworthy that the sheet drawing rate defined by the following equation can be adjusted to as high as 2.4 to 3.6, especially 2.7 to 3.3.

Expansion of the drawn molten sheet in the mold can be easily effected by evacuating the space between the sheet and the mold surface, introducing a pressurized gas into between the plug and the sheet, or a combination of these operations. Generally, it is advantageous to use compressed air under 1 to 5 kg/cm$^2$. Advantageously, the temperature of the mold surface is generally 5° to 40° C.

The present invention is useful for production of containers having a height/diameter rato of at least about 0.8, especially 1.0 to 1.7.

According to this invention, by employing the means described above, the amount of the molten plastic sheet drawn into the mold can be increased, and there can be produced containers which have a uniform thickness distribution in the height direction and good appearance characteristics without the occurrence of a drag line on their side wall. The present invention markedly increases the ratio of the plastic sheet utilized for production of a deep-drawn container, and also greatly improves molding operability.

Furthermore, since this container is formed by the molten sheet molding technique, it has excellent hot water resistance (heat distortion resistance) and can be sterilized by, for example, retorting and its contents can be heated or warmed in an electronic oven. Moreover, the provision of the oxygen-barrier layer imparts excellent preservability. Thus, the invention has many advantages.

EXAMPLES

In the following Examples, the containers were evaluated by the following methods, and characteristic values are as defined below.

Methods of Evaluating The Containers (1) Appearance

The molded containers were macroscopically observed for injuries, depressions, etc. (n=24).

(2) Thickness distribution

Measured by a micrometer (average value on n=5).

(3) Container deformation

The containers were macroscopically observed for the presence or absence of perceptible deformations when they were filled with contents and after retorting. (n=24).

(4) Volume shrinkage $$\text{Volume shrinkage} = \frac{(\text{Inner capacity before filling}) - (\text{inner capacity after retorting})}{\text{Inner capacity before filling}} \times 100(\%)$$
(average value on $n = 12$)

(5) Falling strength

Filled containers after retorting were cooled to 5° C., maintained upstanding, upside down, or wideways, and let fall twice onto a concrete surface. The number of broken containers was examined. (n=10 for each falling direction).

Definitions of coefficients:

$$\text{Plug pushing rate} = \frac{\text{Plug pushing depth}}{\text{Mold depth}} \times 100(\%)$$

$$\text{Plug volume ratio} = \frac{\text{Volume of the plug within the mold}}{\text{Volume of the mold}} \times 100(\%)$$

$$\text{Sheet drawing rate} = \frac{\text{Area of the sheet corresponding to the unit weight of the container}}{\text{Projected area as seen from the upper surface of the container (excluding the flange portion)}}$$

EXAMPLE 1

A flange-equipped round container (inner capacity about 315 ml) having an outside diameter of $\phi$ 66, a height of 102 mm and a flange diameter of $\phi$ 75 was produced by the process of this invention by using a vacuum-pressure forming machine from a multilayer sheet having a total thickness of 2 mm and composed of polypropylene (MI=0.5)/adhesive (vinyl acetate/alcohol copolymer)/gas-barrier resin (Saran "PVDC")/adhesive (vinyl acetate/alcohol copolymer)/polypropylene (MI=0.5) which was produced by ordinary coextrusion sheet molding.

A Bakelite annular member having an opening diameter of $\phi$ 100, an outside diameter of $\phi$ 180 and an opening height of 15 mm was provided in intimate contact on the upper surface of an aluminum mold (opening diameter $\phi$ 68 mm, depth 103 mm). Then angle ($\theta$) of the tangent contacting the inner circumference of the annular member and the opening portion of the mold with respect to the upper surface of the annular member was 40 degrees. An aluminum plug having a tip outside diameter of φ 45 was used, and in order to prevent temperature fall of the molten sheet, had a heater built therein. The plug was controlled to about 140° C.

The end portions of the sheet (200 mm × 20 mm) were fixed by a clamp, and heated to a temperature (180°–190° C.) above its melting point from above and below by in far infrared heaters in the heating step. Then, it was transferred to the molding step. First, the mold equipped with the annular member on its upper surface rose from below the sheet. The annular member contacted the sheet and pushed it up. Simultaneously with it, or with some delay, the plug was pushed into the opening portion of the annular member from above. While the molten sheet was allowed to slide over the annular member, the surrounding sheet was pulled in, and at this time, a positive pressure was created in the space between the sheet and the mold. The pressure measured was 0.12 kg/cm$^2$. This positive pressure pushed the sheet to the plug, and its wrapping was accelerated. As a result, the molten sheet was drawn with a uniform thickness, and its contacting with the mouth portion of the cooled mold was prevented. The sheet drawing rate at this time was 3.0; the plug pushing rate, 95%; and the plug volume ratio, 55%. After the sheet was drawn into the mold, the sheet was held by a flange ring and the flange portion of the mold to maintain the space between the sheet and the mold vacuum. With some delay, compressed air (2 kg/cm$^2$) was introduced into between the plug and the sheet. The sheet was transferred from the plug to the mold and cooled. Thus, the molding was completed.

The appearance of the container molded by the above method was observed and its thickness distribution was measured. Its appearance was good without injury, and its thickness distribution was uniform both in the height direction and in the circumferential direction.

Meat sauce was filled at 80° to 85° C. into the container (head space: 5 mm). A closure material composed of PET/aluminum/PP was applied to the container by heat sealing. The filled container was then subjected to equal pressure retorting treatment at 115° C. for 40 minutes (come up 25 minutes). After retorting, the container was examined for the state of deformation, the volume shrinkage and the falling strength. The results are shown in Table 1.

The results given in Table 1 clearly show that the deep-drawn container obtained by the process of this invention had a uniform thickness distribution both in the height direction and in the circumferential direction, did not undergo abnormal deformation even by retorting, and had sufficient strength; and that it was very good as a retortable container.

EXAMPLE 2

In the same way as in Example 1, the multilayer sheet was heat-melted, and then in the molding step, wrapping of the sheet about the plug was promoted further. In order to increase the sheet drawing rate, the molten sheet was drawn into the mold and molded while air was fed from a vacuum hole into the mold. At this time, the pressure inside the mold was 0.2 kg/cm$^2$, and the sheet drawing rate was 3.2.

The container obtained by the above method was evaluated as in Example 1. The results are shown in Table 1.

The results given in Table 1 clearly show that a deep-drawn container having a better thickness distribution could be molded by controlling the pressure in the mold.

EXAMPLE 3

As in Example 1, the multilayer sheet was heat-melted, and then an annular member of Teflon resin having an opening diameter of φ 80, an outside diameter of φ 180 and an opening height of 4 mm was used. Otherwise, by the same method as in Example 1, a deep-drawn container was formed.

At this time, the pressure inside the mold was 0.13 kg/cm$^2$, and the sheet drawing rate was 3.0.

The container obtained by the above method was evaluated as in Example 1, and the results are shown in Table 1.

The results given in Table 1 clearly show that the container obtained by deep-draw molding by the process of this invention had a uniform thickness distribution and excellent properties after retorting.

COMPARATIVE EXAMPLE 1

In the apparatus shown in FIG. 1, the bottom of the mold (10) was formed in such a structure that it could be vertically moved (not particularly shown) for easy releasing of the container from the mold after molding. Otherwise, the molding was carried out in the same way as in Example 1.

By this method, air-tightness could not be maintained in the movable part of the mold at the time of pulling the molten sheet into the mold by the plug. Hence, no pressure was produced within the mold.

The appearance of the container obtained by the above method was such that many traces of contact with the mouth portion of the mold were seen, and the thickness in the height direction was very non-uniform. As in Example 1, the container was filled, retorted and then evaluated. The results are shown in Table 1. There was great deformation owing to the retorting, and the falling strength of the container was not satisfactory.

COMPARATIVE EXAMPLE 2

In the same way as in Example 1, the multilayer sheet was heat-melted, and then in the molding step, the molten sheet was held by the flange and molded by lowering the plug and drawing the sheet into the mold instead of allowing it to slide over the upper surface of the mold. The barrel portion of the container was broken.

TABLE 1

| | Pressure in the mold (kg/cm$^2$) | Sheet drawing rate | Shape of the annular member (θ°) | Shape of the plug (volume ratio %) | Evaluation (before retorting) | | Evaluation (after retorting) | | |
|---|---|---|---|---|---|---|---|---|---|
| | | | | | Appearance | Thickness distribution (unit weight) | Container deformation | Volume shrinkage (%) | Falling strength (number of broken containers) |
| Ex. 1 | 0.12 | 3.0 | 40° | 55 | good | good (19 g) | none | 0.5 | 0/30 |
| Ex. 2 | 0.20 | 3.2 | 40° | 55 | good | good (20 g) | none | 0.3 | 0/30 |
| Ex. 3 | 0.13 | 3.0 | 33° | 55 | good | good (19 g) | none | 0.5 | 0/30 |

TABLE 1-continued

| | Pressure in the mold (kg/cm²) | Sheet drawing rate | Shape of the annular member (θ°) | Shape of the plug (volume ratio %) | Evaluation (before retorting) | | Evaluation (after retorting) | | |
|---|---|---|---|---|---|---|---|---|---|
| | | | | | Appearance | Thickness distribution (unit weight) | Container deformation | Volume shrinkage (%) | Falling strength (number of broken containers) |
| Comp. Ex. 1 | 0 | 2.1 | 40° | 55 | many injuries | very non-uniform (13 g) | great deformation in a portion having a non-uniform thickness | 3.5 | 18/30 |
| Comp. Ex. 2 | 0 | — | 40° | 55 | | | Barrel portion broken | | |

Ex.: Example,
Comp. Ex.: Comparative Example

We claim:

1. A process for producing a deep-drawn plastic container by plug assist vacuum and/or pressure forming of a plastic sheet in a molten state, which comprises
    arranging a plug and, in a spaced-apart relationship an upper mold and a mold having a cavity inside and an opening at the upper end and having an annular member with heat insulating property and slipperiness which is positioned above, and diametrically outwardly of, the opening of the mold;
    wherein the angle ($\theta$) of the tangent contacting an inner circumference of the annular member and the opening of the mold with respect to a plane containing the annular member is from 20 to 70 degrees;
    feeding a plastic sheet in a molten state supported by a fixing member between the mold and the plug;
    moving the mold toward the molten plastic sheet so that the annular member engages an undersurface of the molten plastic sheet;
    moving the plug toward the mold in a closing direction while maintaining direct contact of the annular member with the molten plastic sheet thereby creating a positive pressure between the mold and the molten sheet by the movement of the plug toward the mold;
    drawing the molten sheet into the cavity in a state that the molten plastic sheet is wrapped along a large length about a side wall portion of the plug while allowing the molten plastic sheet to slide over the annular member;
    clamping the drawn, molten sheet between the mold having a cavity inside and the upper mold to effect sealing in the mold;
    expanding the drawn molten plastic sheet into contact with the surface of the mold having a cavity; and
    cooling the plastic sheet by contact with the surface of the mold having a cavity.

2. The process of claim 1 in which the pressure of the space between the mold and the molten sheet is controlled to 0.02 to 0.50 kg/cm² (gauge).

3. The process of claim 1 in which the outside diameter of the plug tip is 35 to 80% of the opening diameter of the mold cavity.

4. The process of claim 1 in which the molding is carried out so that the plug volume ratio defined by the following equation $$\text{Plug volume ratio} = \frac{\text{Plug volume in the mold}}{\text{Mold volume}} \times 100$$

is 25 to 80%.

5. The process of claim 1 in which the plastic sheet is composed of a laminated structure of propylene resin-/oxygen-barrier resin/propylene resin.

6. The process of claim 1, wherein the annular member consists essentially of a heat-resistant plastic material selected from the group consisting of a novolak phenol resin, polycarbonate and polytetrafluoroethylene.

7. The process as in claim 1, wherein the annular member consists essentially of polytetrafluoroethylene.

8. The process of claim 1, wherein the mold is formed from a metal.

9. The process of claim 1, wherein the mold is formed from aluminum or an aluminum alloy.

10. The process of claim 1, in which the annular member is provided so that a tangent contacting the inner circumference and the opening portion of the mold cavity forms an angle of 35° to 45° with respect to the upper surface of the annular member.

11. The process of claim 1, wherein the plug is formed from a heat-resistant plastic.

12. The process of claim 1, wherein the plug has a tip with a diameter in the range of 35 to 80% of the inner diameter of the opening portion of the mold.

13. A process for producing a deep-drawn plastic container by plug assist vacuum and/or pressure forming of a plastic sheet in a molten state, which comprises
    arranging a plug and, in a spaced-apart relationship, an upper mold and a mold having a cavity inside and an opening at the upper end and having an annular member with heat insulating property and slipperiness formed from a heat-resistant plastic material having a low coefficient of friction which is positioned above, and diametrically outwardly of, the opening of the mold;
    wherein the angle ($\theta$) of the tangent contacting an inner circumference of the annular member and the opening of the mold with respect to a plane containing the annular member is from 20 to 70 degrees;
    feeding a plastic sheet in a molten state supported by a fixing member between the mold and the plug;
    moving the mold toward the molten plastic sheet so that the annular member engages an undersurface of the molten plastic sheet;
    moving the plug toward the mold in a closing direction while maintaining direct contact of the annular member with the molten plastic sheet thereby creating a positive pressure between the mold and the molten sheet by the movement of the plug toward the mold;
    drawing the molten sheet into the cavity in a state that the molten plastic sheet is wrapped along a large length about a side wall portion of the plug while allowing the molten plastic sheet to slide over the annular member;

clamping the drawn, molten sheet between the mold having a cavity inside and the upper mold to effect sealing in the mold;

expanding the drawn molten plastic sheet into contact with the surface of the mold having a cavity; and cooling the plastic sheet by contact with the surface of the mold having a cavity.

* * * * *